United States Patent
Yeou et al.

(10) Patent No.: US 10,109,863 B2
(45) Date of Patent: *Oct. 23, 2018

(54) COMPOSITE BINDER COMPOSITION FOR SECONDARY BATTERY, CATHODE AND LITHIUM BATTERY CONTAINING THE BINDER COMPOSITION

(71) Applicant: Samsung SDI Co., Ltd., Yongin-si, Gyeonggi-Do (KR)

(72) Inventors: Jung-Ock Yeou, Yongin-si (KR); Beom-Wook Lee, Yongin-si (KR); Sam-Jin Park, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 131 days.

This patent is subject to a terminal disclaimer.

(21) Appl. No.: 14/167,810

(22) Filed: Jan. 29, 2014

(65) Prior Publication Data

US 2015/0083975 A1     Mar. 26, 2015

(30) Foreign Application Priority Data

Sep. 24, 2013 (KR) .......................... 10-2013-0113472

(51) Int. Cl.
*C08L 1/00* (2006.01)
*H01M 4/62* (2006.01)
(Continued)

(52) U.S. Cl.
CPC .............. *H01M 4/623* (2013.01); *H01M 4/13* (2013.01); *C08L 1/00* (2013.01); *H01M 4/131* (2013.01); *H01M 10/052* (2013.01)

(58) Field of Classification Search
CPC ........................................................ C08L 1/00

USPC ....................................................... 252/182.1
See application file for complete search history.

(56) References Cited

U.S. PATENT DOCUMENTS 9,601,775 B2 * 3/2017 Fukumine ............. H01M 4/622
2009/0111025 A1 4/2009 Lee et al.
(Continued)

FOREIGN PATENT DOCUMENTS

JP        9-63590 A     3/1997
JP        9-199130 A    7/1997
(Continued)

OTHER PUBLICATIONS

Korean Office Action dated Oct. 21, 2016 for Korean Patent Application No. KR 10-2013-0113472 which cites the above-identified references numbered 1-2, and from which subject U.S. Appl. No. 14/167,810 claims priority.

(Continued)

*Primary Examiner* — William D Young
(74) *Attorney, Agent, or Firm* — Knobbe Martens Olson & Bear LLP

(57) ABSTRACT

In an aspect, a binder composition, a cathode including the same, and a lithium battery including the cathode, wherein the binder composition includes a first fluorine containing binder including a polar functional group; a second fluorine containing binder not including a polar functional group; and a non-fluorine containing binder including a repeating unit resulting from polymerization of an acryl monomer and a repeating unit resulting from polymerization of an olefin monomer, wherein the first fluorine containing binder is a vinylidene fluoride containing binder is provided.

11 Claims, 1 Drawing Sheet

(51) Int. Cl.
*H01M 4/13* (2010.01)
*H01M 4/131* (2010.01)
*H01M 10/052* (2010.01)

(56) References Cited

U.S. PATENT DOCUMENTS

| | | | | |
|---|---|---|---|---|
| 2012/0309892 | A1* | 12/2012 | Ootsuka | H01M 4/13 |
| | | | | 524/546 |
| 2013/0280606 | A1* | 10/2013 | Sekine | C08F 220/42 |
| | | | | 429/211 |

FOREIGN PATENT DOCUMENTS

| | | | |
|---|---|---|---|
| JP | 11-045720 | A | 2/1999 |
| JP | 2003-317722 | A | 11/2003 |
| JP | 4337331 | B2 | 7/2009 |
| JP | 2010-97817 | A | 4/2010 |
| JP | 2011-070997 | A | 4/2011 |
| JP | 2012-054147 | A | 3/2012 |
| JP | 2013-62257 | A | 4/2013 |
| KR | 10-2007-0090502 | A | 9/2007 |
| KR | 10-2003-0027969 | A | 4/2013 |
| WO | WO 97/27260 | | 7/1997 |

OTHER PUBLICATIONS

Korean Registration Determination Certificate dated Apr. 14, 2017 for Korean Patent Application N. KR 10-2013-0113472, which cites the above-identified reference numbered 1, and from which subject U.S. Appl. No. 14/167,810 claims priority.

* cited by examiner

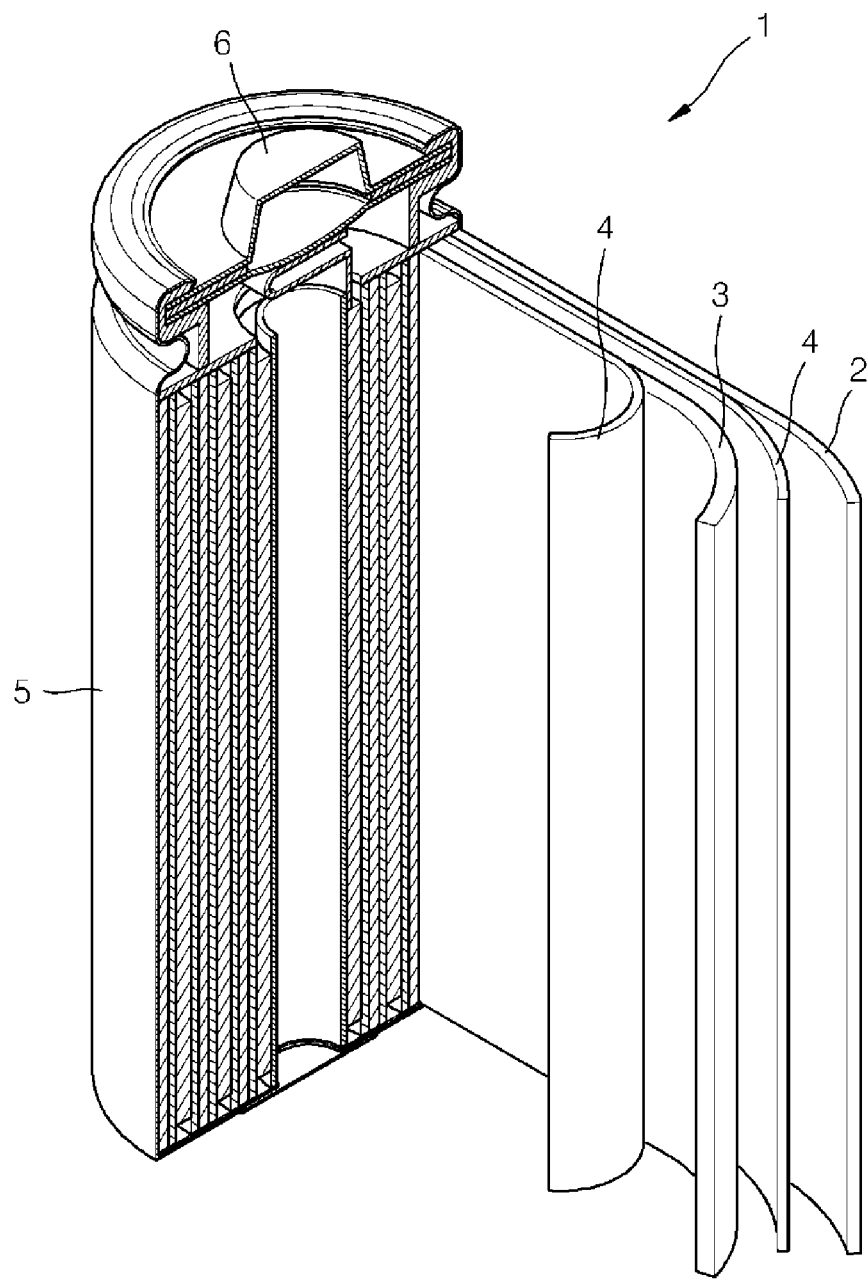

COMPOSITE BINDER COMPOSITION FOR SECONDARY BATTERY, CATHODE AND LITHIUM BATTERY CONTAINING THE BINDER COMPOSITION

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2013-0113472, filed on Sep. 24, 2013, in the Korean Intellectual Property Office, the disclosure of which is incorporated herein in its entirety by reference.

BACKGROUND

Field

This disclosure relates to a binder composition for a secondary battery, a cathode and a lithium battery including the binder composition.

Description of the Related Technology

Lithium batteries are used for various purposes due to their high voltage and high energy density. For example, an area of electrical vehicles (e.g., HEV and PHEV) requires a lithium battery capable of operating at a high temperature, charging and discharging a large amount of electricity, enabling long-term use and having high energy density and excellent cycle life characteristics.

Relative amounts of electrode active material and conducting agent need to be increased and binder needs to be decreased in an electrode to provide a lithium battery with high energy density and excellent life characteristics. However, when the amount of a binder decreases, dispersibility and adhesiveness of the electrode active material and/or the conducting agent and flexibility of an electrode active material layer may decrease. Thus, cycle life characteristics of lithium battery may be deteriorated due to detachment of the electrode active material from a current collector during charging and discharging the lithium battery. Therefore, a binder capable of providing enhanced dispersibility of an electrode active material and/or a conducting agent, enhanced adhesiveness of an electrode active material and/or a conducting agent with respect to a current collector, and enhanced flexibility of the electrode plate with a small amount of the binder is needed.

For example, a fluorine containing binder, such as a poly(vinylidene fluoride) (PVDF) not containing a polar group, is hardly swelled in an organic electrolyte solution and thus is useful in maintaining an electrode structure while operating a battery and may improve dispersibility of an electrode active material. However, the fluorine containing binder, such as PVDF not containing a polar group, provides poor dispersibility of a conducting agent, poor adhesiveness to the electrode plate, and poor flexibility of the electrode plate.

Moreover, a non-fluorine containing binder, such as an acrylonitrile-butadiene hydride, provides enhanced dispersibility of a conducting agent and enhanced flexibility of the electrode plate than those of the fluorine containing binder, but adhesiveness to a current collector is still poor.

Therefore, a binder capable of overcoming the problems of the conventional art and improving energy density and cycle life characteristics of a lithium battery by providing improved adhesiveness and flexibility at the same time is needed.

SUMMARY

One or more embodiments of the present disclosure include a binder composition for a secondary battery of a novel structure having improved adhesiveness and flexibility.

One or more embodiments of the present disclosure include a cathode including the binder.

One or more embodiments of the present disclosure include a lithium battery including the cathode.

According to one or more embodiments of the present disclosure, a binder composition for a secondary battery includes a first fluorine containing binder including a polar functional group; a second fluorine containing binder not including a polar functional group; and a non-fluorine containing binder including a repeating unit resulting from polymerization of an acryl monomer and a repeating unit resulting from polymerization of an olefin monomer, wherein the first fluorine containing binder is a vinylidene fluoride containing binder.

According to one or more embodiments of the present disclosure, a cathode includes a cathode active material; a conducting agent; and the binder composition.

According to one or more embodiments of the present disclosure, a lithium battery includes the cathode.

BRIEF DESCRIPTION OF THE DRAWINGS

These and/or other aspects will become apparent and more readily appreciated from the following description of the embodiments, taken in conjunction with the accompanying drawings in which:

FIG. 1 is a schematic view of a lithium battery according to an embodiment.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the FIGURES, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Additional aspects will be set forth in part in the description which follows and, in part, will be apparent from the description, or may be learned by practice of the presented embodiments.

Hereinafter, a binder composition for a secondary battery, a cathode including the binder composition, and a lithium battery including the cathode will be described in detailed by referring to exemplary embodiments.

In consideration of deterioration of adhesiveness and flexibility of an electrode plate and dispersibility of a conducting agent in a conventional binder for a secondary battery such as a fluorine containing binder not containing a polar group, a method that may improve all of adhesiveness and flexibility of an electrode plate and dispersibility of a conducting agent at the same time may be analyzed. Some embodiments provide a binder composition prepared by mixing a fluorine containing binder containing a polar functional group and a non-fluorine containing binder including a repeating unit resulting from polymerization of an acryl monomer and a repeating unit resulting from polymerization of an olefin monomer with a fluorine containing binder not containing a polar group, a binder composition for a secondary battery having improved energy density and cycle life characteristics is completed. In some embodiments, the binder composition provides flexibility and adhesiveness of an electrode plate, and dispersibility of a conducting agent simultaneously.

According to an embodiment, the binder composition of a secondary battery includes a first fluorine containing binder including a polar functional group; a second fluorine containing binder not including a polar functional group; and a non-fluorine containing binder including a repeating unit resulting from polymerization of an acryl monomer and a repeating unit resulting from polymerization of an olefin monomer, wherein the first fluorine containing binder is a vinylidene fluoride containing binder. In some embodiments, the binder composition for a secondary battery provides enhanced adhesiveness to a current collector, enhanced flexibility of electrode plate, and enhanced dispersibility of a conducting agent within an electrode mixture by including the first fluorine containing binder having an excellent adhesiveness to a current collector, the second fluorine containing binder capable of retaining an electrode structure during battery operation, and the non-fluorine containing binder including a repeating unit resulting from polymerization of an acryl monomer and a repeating unit resulting from polymerization of an olefin monomer capable of improving electrode plate flexibility and conducting agent dispersibility. In this regard, cycle life characteristics of a lithium battery including the binder composition for a secondary battery may be improved. Further, the lithium battery including the binder composition for a secondary battery may have the improved cycle life characteristics at a high voltage equal to or greater than 4.3 V.

In particular, since the binder composition for a secondary battery includes a fluorine containing binder and a non-fluorine containing binder including a repeating unit resulting from polymerization of an acryl monomer and a repeating unit resulting from polymerization of an olefin monomer, the binder composition enables a fabrication of an electrode having a higher electrode mixture density and a thicker electrode active material layer (i.e., electrode mixture layer), thus resultantly, provides a lithium battery having a high energy density and improved cycle life characteristics.

In some embodiments of the binder composition for a secondary battery, the polar functional group of the first fluorine containing binder may be at least one selected from the group consisting of a carboxylic acid group, a sulfonic acid group, a phosphoric acid group, a hydroxyl group, and a salt thereof, but the polar functional group is not limited thereto, and any group that may be used as a polar functional group in the art may be used.

For example, introduction of the polar functional group into the first fluorine containing binder may be performed by polymerizing monomers including at least one of a carboxylic acid group, a sulfonic acid group, a phosphoric acid group, a hydroxyl group, and a salt thereof.

Examples of a monomer having a carboxylic acid group may include a monocarboxylic acid and a derivative thereof and a dicarboxylic acid and a derivative thereof. Examples of a monocarboxylic acid may include an acrylic acid, a methacrylic acid, and a crotonic acid. Examples of a derivative of a monocarboxylic acid may include a 2-ethylacrylic acid, an isocrotonic acid, an α-acetoxyacrylic acid, a β-trans-aryloxyacrylic acid, an α-chloro-β-E-methoxyacrylic acid, and a β-diaminoacrylic acid. Examples of a dicarboxylic acid may include a maleic acid, a fumaric acid, and an itaconic acid. Examples of a derivative of a dicarboxylic acid may include a maleate ester such as a methyl allyl maleate, a diphenyl maleate, a nonyl maleate, a decyl maleate, a dodecyl maleate, an octadecyl maleate, and a fluoroalkyl maleate, wherein a maleic acid of the maleate ester may be a methylmaleic acid, a dimethylmaleic acid, a phenylmaleic acid, a chloromaleic acid, a dichloromaleic acid, and a fluoromaleic acid. Further, a derivative of a dicarboxylic acid may be an acid anhydride producing a carboxyl group through hydrolysis. Examples of an acid anhydride of a dicarboxylic acid may include a maleic anhydride, an acrylic anhydride, a methyl maleic anhydride, and a dimethyl maleic anhydride. Further, a derivative of a dicarboxylic acid may include a monoester and a diester of an α,β-ethylenically unsaturated polycarboxylic acid such as a monoethyl maleate, a diethyl maleate, a monobutyl maleate, a dibutyl maleate, a monoethyl fumarate, a diethyl fumarate, a monobuty fumarate, a dibutyl fumarate, a monocyclohexyl fumarate, a dicyclohexyl fumarate, a monoethyl itaconate, a diethyl itaconate, a monobutyl itaconate, and a dibutyl itaconate.

Examples of a monomer having a sulfonic acid group may include a vinyl sulfonic acid, a methylvinyl sulfonic acid, a (meth)allyl sulfonic acid, a styrene sulfonic acid, an ethyl (meth)acrylic-2-sulfonate, a 2-acrylamide-2-methylpropane sulfonic acid, and a 3-allyloxy-2-hydroxypropane sulfonic acid.

Examples of a monomer having a phosphoric acid group may include 2-(meth)acryloyloxyethyl phosphate, methyl-2-(meth)acryloyloxyethyl phosphate, and ethyl-(meth)acryloyloxyethyl phosphate.

Examples of a monomer having a hydroxyl group include ethylenically unsaturated alcohols, such as (meth)allyl alcohol, 3-buten-1-ol, and 5-hexane-1-ol; alkanolesters of an ethylenically unsaturated carboxylic acid, such as 2-hydroxyethyl acrylate, 2-hydroxypropyl acrylate, 2-hydroxyethyl methacrylate, 2-hydroxypropyl methacrylate, di-2-hydroxyethyl maleate, di-2-hydroxybutyl maleate, di-2-hydroxypropyl itaconate; esters of polyalkylene glycol and (meth)acrylic acid represented by a general formula of $CH_2=CR^1—COO—(C_nH_{2n}O)_m—H$ (m represents an integer of 2 to 9, n represents an integer of 2 to 4, and $R^1$ represents hydrogen or a methyl group); mono(meth)acrylate esters of dihydroxy ester of dicarboxylic acid such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycol such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; vinylethers such as 2-hydroxyethylvinylether and 2-hydroxypropylvinylether; mono(meth)allyl ethers of alkylene glycol such as (meth)allyl hydroxyethyl ether, (meth)allyl-2-hydroxypropylether, (meth)allyl-3-hydroxypropylether, (meth)allyl-2-hydroxy butylether, (meth)allyl-3-hydroxybutylether, (meth)allyl-4-hydroxybutylether, and (meth)allyl-6-hydroxyhexylether; polyoxyalkylene glycol mono(meth)allyl ethers such as diethylene glycol mono (meth)allyl ether and dipropylene glycol mono(meth)allyl ether; mono(meth)allylethers of a halogen or hydroxy substituted (poly)alkylene glycol such as glycerol mono(meth) allyl ether, (meth)allyl-2-chloro-3-hydroxypropyl ether, and (meth)allyl-2-hydroxy-3-chloropropyl ether; mono(meth)allyl ethers of polyhydric phenol such as eugenol and isoeugenol and halogenated products thereof; and (meth)allyl thioethers of alkylene glycol such as (meth)allyl-2-hydroxyethyl thioether and (meth)allyl-2-hydroxypropyl thioether.

A hydrophilic polar group may be a carboxylic acid group or a sulfonic acid group in terms of excellent adhesiveness between cathode active materials and adhesiveness between a cathode active material layer and a current collector. Particularly, a carboxylic acid group may be used in terms of its ability to capture transition metal ions that are eluted from a cathode active material with a high efficiency.

In the binder composition for a secondary battery, a content of the repeating unit including a polar functional group included in the first fluorine containing binder may be 10 mol % or less. For example, a content of the repeating unit including a polar functional group included in the first fluorine containing binder may be in a range of more than 0 mol % to 9 mol % or less, more than 0 mol % to 8 mol % or less, more than 0 mol % to 7 mol % or less, or more than 0 mol % to 5 mol % or less. When a content of the repeating unit including the polar functional group is too high, a solvent resistance with respect to an electrolyte may be degraded, and thus an electrode structure may not be maintained.

In the binder composition for a secondary battery, a weight average molecular weight of the fluorine containing binder may be 100,000 g/mol or more, for example, in a range of 300,000 g/mol to 1,500,000 g/mol or 500,000 g/mol to 1,500,000 g/mol. The weight average molecular weight is a polystyrene calibrated value measured by a gel permeation chromatography. Electrode plate adhesiveness may be further improved in the range of the weight average molecular weight of the first fluorine containing binder.

In the binder composition for a secondary battery, the first fluorine containing binder may include a repeating unit resulting from polymerization of a monomer containing a polar functional group; a repeating unit resulting from polymerization of a vinylidene fluoride monomer; and, optionally, a repeating unit resulting from polymerization of a fluorine-containing monomer that is at least one selected from the group consisting of tetrafluoroethylene, hexafluoropropylene, chlorotrifluoroethylene, fluorovinyl, and perfluoroalkylvinylether.

For example, the vinylidene fluoride containing binder containing a polar functional group, i.e., the first fluorine containing binder, may be a copolymer of a monomer including a polar functional group and a vinylidene fluoride monomer or a copolymer of a monomer including a polar functional group, a vinylidene fluoride monomer, and an aforementioned other fluorine monomer. For example, the vinylidene fluoride containing binder containing a polar functional group may be a polar functional group containing monomer-vinylidene fluoride copolymer, a polar functional group containing monomer-vinylidene fluoride-hexafluoropropylene copolymer, or a polar functional group containing monomer-vinylidene fluoride-chlorotrifluoroethylene copolymer. A content of a repeating unit resulting from polymerization of a fluorine monomer other than the vinylidene fluorine monomer in the copolymer may be 5 mol % or less.

In the first fluorine containing binder, a content of a fluorine-containing monomer unit may be 50 mol % or more. For example, a content of a fluorine-containing monomer unit may be 60 mol % or more, 70 mol % or more, 80 mol % or more, or 90 mol % or more.

In the binder composition for a secondary battery, a content of the first fluorine containing binder may be 3 wt % to 27 wt % based on the total weight of the binder composition. For example, a content of the first fluorine containing binder may be 5 wt % to 25 wt % based on the total weight of the binder composition. When a content of the first fluorine containing binder is less than 3 wt %, adhesiveness of an electrode active material layer with respect to an electrode plate (i.e., current collector) may be degraded, and when a content of the first fluorine containing binder is greater than 27 wt %, stability of electrode active material slurry may be degraded.

In the binder composition for a secondary battery, the second fluorine containing binder may be a vinylidene fluoride containing binder not containing a polar functional group. In some embodiments, the vinylidene fluoride containing binder not containing a polar functional group may be a conventional vinylidene fluoride containing binder.

In some embodiments, the second fluorine containing binder may be a homopolymer of a vinylidene fluoride monomer or a copolymer of a vinylidene fluoride monomer and a fluorine-containing monomer that is one selected from the group consisting of tetrafluoroethylene, hexafluoropropylene, chlorotrifluoroethylene, fluorovinyl, and perfluoroalkylvinylether. In particular, the second fluorine containing binder may be a vinylidene fluoride homopolymer, a vinylidene fluoride-hexafluoropropylene copolymer, or a vinylidene fluoride-chlorotrifluoroethylene copolymer.

For example, in the binder composition for a secondary battery, the second fluorine containing binder may include 50 mol % or more of a vinylidene fluoride monomer unit. For example, the second fluorine containing binder may include 50 mol % or more, 60 mol % or more, 70 mol % or more, 80 mol % or more, or 90 mol % or more.

In the binder composition for a secondary battery, a content of the second fluorine containing binder may be in a range of 45 wt % to 82 wt % based on the total weight of the binder composition. For example, a content of the second fluorine containing binder may be in a range of 50 wt % to 82 wt %, or in a range of 50 wt % to 80 wt % based on the total weight of the binder composition. When a content of the second fluorine containing binder is less than 50 wt %, stability of electrode active material slurry may be degraded, and when a content of the second fluorine containing binder is greater than 82 wt %, flexibility and adhesiveness of an electrode active material layer and dispersibility of a conducting agent may be degraded.

In the binder composition for a secondary battery, a weight average molecular weight of the second fluorine containing binder may be 100,000 g/mol or greater. For examples, a weight average molecular weight of the second fluorine containing binder may be in a range of 100,000 g/mol to 1,500,000 g/mol, in a range of 200,000 g/mol to 1,200,000 g/mol, or in a range of 300,000 g/mol to 1,00,000 g/mol. Stability of electrode active material slurry may be improved when a weight average molecular weight of the second fluorine containing binder is within the ranges above, and thus dispersibility of an electrode active material in the electrode active material slurry may be further increased.

In the binder composition for a secondary battery, a non-fluorine containing binder may include a repeating unit resulting from polymerization of an acryl monomer and a repeating unit resulting from polymerization of an olefin monomer.

Examples of an acryl monomer used in preparing the non-fluorine containing binder may include a multifunctional ethylenically unsaturated monomer, and examples of the multifunctional ethylenically unsaturated monomer, constituting a polymerization unit of a (meth)acrylate ester monomer, may include alkylester of acrylic acid such as methylacrylate, ethylacrylate, n-propylacrylate, isopropylacrylate, n-butylacrylate, t-butylacrylate, pentylacrylate, hexylacrylate, heptylacrylate, octylacrylate, 2-ethylhexylacrylate, nonylacrylate, decylacrylate, laurylacrylate, n-tetradecylacrylate, and stearylacrylate; alkylester of methacrylic acid such as methylmethacrylate, ethylmethacrylate, n-propylmethacrylate, isopropylmethacrylate, n-butylmethacrylate, t-butylmethoacrylate, pentylmethacrylate, hexylmethacrylate, heptylmethacrylate, octylmethacrylate, 2-ethylhexylmethacrylate, nonylmethacrylate, decylmethacrylate, laurylmethacrylate, n-tetradecylmethacrylate, and stearylmethacrylate; ester of di(meth)acrylic acid such as ethylene di(meth)acrylate, diethyleneglycol di(meth)acrylate, and ethyleneglycol di(meth)acrylate; and ester of tri(meth)acrylic acid such as trimethylolpropan tri(meth)acrylate, but the acryl monomer is not limited thereto, and any acryl monomer used in the art may be used alone or as a mixture of two or more species thereof.

In the non-fluorine containing binder, examples of an olefin monomer may include conjugated diene monomers, such as 1,3-butadiene, non-conjugated diene monomers, such as 1,4-pentadiene, 1,4-hexadiene, vinylnorbornene, and dicyclopentadiene; and α-olefin monomers, such as ethylene, propylene, 1-butene, 4-methyl-1-pentene, 1-hexene, and 1-octene, but the olefin monomer is not limited thereto, and any olefin monomer in the art may be used alone or as a mixture of two or more species thereof.

For example, the non-fluorine containing binder may be a poly(ethylene-acrylate) containing, poly(propylene-acrylate) containing, or poly(butylene-acrylate) containing binder.

Examples of the poly(ethylene-acrylate) containing binder may include, for example, poly(ethylene-methyl (meth)acrylate), poly(ethylene-ethyl(meth)acrylate), poly(ethylene-propyl(meth)acrylate), poly(ethylene-butyl(meth) acrylate), poly(ethylene-2-ethylhexyl(meth)acrylate), and a copolymer of acronitrile and/or (meth)acrylate with one of the aforementioned species.

Examples of the poly(propylene-acrylatate) containing binder include poly(propylene-methyl(meth)acrylatate), poly(propylene-ethyl(meth)acrylate), poly(propylene-propyl(meth)acrylate), poly(propylene-butyl(meth)acrylate), poly(propylene-2-ethylhexyl(meth)acrylate), and a copolymer of acronitrile and/or (meth)acrylate with one of the aforementioned species.

The poly(propylene-acrylate) containing binder may be, for example, poly(propylene-methyl(meth)acrylate.

Examples of the poly(butylene-acrylate) containing binder include poly(butylene-methyl(meth)acrylate), poly (butylenes-ethyl(meth)acrylate), poly(butylene-propyl (meth)acrylate), poly(butylene-butyl(meth)acrylate), poly (butylene-2-ethylhexyl(meth)acrylate), and a copolymer of acronitrile and/or (meth)acrylate with one of the aforementioned species.

In the non-fluorine containing binder, a content of the repeating unit resulting from polymerization of the acryl monomer may be in a range of 1 wt % to 70 wt %, for example, 2 wt % to 50 wt %, 5 wt % to 30 wt %, or 10 wt % to 25 wt %. When a content of the repeating unit resulting from polymerization of the acryl monomer of the non-fluorine containing binder is too high, solubility in an electrolyte solution increases, and thus cycle life characteristics of a battery may be degraded. Also, when a content of the repeating unit resulting from polymerization of the acryl monomer of the non-fluorine containing binder is too low, dispersibility of an electrode active material may be degraded, and cathode active material slurry may not be obtained, and thus uniformity of an electrode obtained therefrom may be degraded.

For example, the repeating unit resulting from polymerization of the acryl monomer of the non-fluorine containing binder may include a nitrile group. By including the non-fluorine based binder containing the repeating unit having a nitrile group, the electrode active material slurry for forming an electrode active material layer may be preserved for a long period of time in a stable state since dispersibility of an electrode active material is improved in the electrode active material slurry. Further, flexibility of the electrode active material layer may be improved.

For example, in the non-fluorine containing binder, the repeating unit resulting from polymerization of the olefin monomer may include a conjugated diene monomer. In the non-fluorine containing binder, the repeating unit resulting from polymerization of a conjugated diene monomer may be a repeating unit having a linear alkylene structure. In a polymer constituting the non-fluorine containing binder, the repeating unit having a linear alkylene structure may 4 carbon atoms, for example, 4 to 16 carbons or 4 to 12 carbons.

By introducing the repeating unit having a non-polar linear alkylene structure into the polymer constituting the non-fluorine containing binder, dispersibility of a conducting agent that may be added to the electrode active material slurry when needed, is improved in the electrode active material slurry, thus a uniform electrode may be easily manufactured. Also, since the conducting agent is uniformly distributed in the electrode, an internal resistance of the cathode decreases, and as a result, cycle life characteristics and output characteristics of a lithium battery may improve. Moreover, by introducing the repeating unit having a linear alkylene structure into the polymer constituting the non-fluorine containing binder, battery characteristics may be improved since swelling of the electrode with respect to an electrolyte is optimized.

In the non-fluorine containing binder, a content of the repeating unit having a linear alkylene structure including at least 4 carbons may be in a range of 30 wt % to 99 wt %, for example, 50 wt % to 98 wt %, 70 wt % to 70 wt %, or 75 wt % to 90 wt %. The content of the repeating unit means a content of the monomer corresponding to the repeating unit having a linear alkylene structure based on the total amount of the monomers used for preparing the non-fluorine binder polymer.

The non-fluorine containing binder may further include a repeating unit including a polar functional group. The polar functional group may be a functional group capable of dissociating protons (hydrogens) in an aqueous solvent or a salt in which a proton is substituted with a metal cation. For example, the polar functional group may be a carboxylic acid group, a sulfonic acid group, a phosphoric acid group, a hydroxyl group, or a salt thereof. Adhesiveness may improve by introducing a polar functional group in a polymer constituting the non-fluorine containing binder.

A content of the repeating unit including a polar functional group in the non-fluorine containing binder may be in a range of 0.05 wt % to 10 wt %, for example, 0.1 wt % to 8 wt % or 1 wt % to 6 wt %. The content of the repeating unit means a content of the monomer corresponding to the repeating unit having a polar functional group based on the total amount of the monomers used for preparing the non-fluorine binder polymer.

An iodine value of the non-fluorine containing binder may be 100 or less, for example, in a range of greater than 0 to 90 (i.e., greater than 0 to 90 mg/100 mg), greater than 0 to 30 (i.e., greater than 0 to 30 mg/100 mg), or greater than 0 to 10 (i.e., greater than 0 to 10 mg/100 mg). When an iodine value of the non-fluorine containing binder is greater than 100, stability of an oxidation potential degrades due to unsaturated bonding included in the binder, and thus cycle life characteristics at a high temperature of a battery may be deteriorated (an iodine value of the non-fluorine containing binder being 0 has no disadvantages, but manufacturing a non-fluorine containing binder with an iodine value of 0 is not possible). A weight average molecular weight of the non-fluorine containing binder may be in a range of 100,000 g/mol to 1,000,000 g/mol. For example, a weight average molecular weight of the non-fluorine containing binder may be in a range of 100,000 g/mol to 800,000 g/mol, 100,000 g/mol to 600,000 g/mol, 100,000 g/mol to 500,000 g/mol, or 100,000 g/mol to 300,000 g/mol. When a weight average molecular weight of the non-fluorine containing binder is within the range above, electrode flexibility and dispersibility of a conducting agent may be improved.

For example, the non-fluorine containing binder include the repeating unit having a nitrile group and a repeating unit having a linear alkylene structure including at least 2 carbon atoms and, optionally, may further include a repeating unit having a polar functional group. The non-fluorine containing binder may be manufactured by polymerizing a monomer deriving a repeating unit having a nitrile group, a monomer deriving a repeating unit including a linear alkylene structure, and, optionally, a monomer deriving a repeating unit having a polar functional group. Also, the repeating unit including a linear alkylene structure be manufactured by obtaining a polymer having a repeating unit having an unsaturated bond and then adding a hydrogen thereto. An iodine value of the non-fluorine containing binder may be controlled by adjusting an amount of the added hydrogen.

Examples of the monomer deriving a repeating unit having a nitrile group may include an α,β-ethylenically unsaturated nitrile monomer. Examples of the α,β-ethylenically unsaturated nitrile monomer include any α,β-ethylenically unsaturated compound having a nitrile group, for example, acronitriles; α-halogenoacrylonitriles such as α-chloroacrylonitrile and α-bromoacrylonitrile; α-alkylacrylonitriles such as methacrylonitrile; for example, acrlyronitrle and methacrylonitrile that may be used alone or as a mixture of two or more selected therefrom.

A method of introducing the repeating unit having a linear alkylene structure into the non-fluorine containing binder is not particularly limited, but may include introducing a conjugated diene monomer unit and adding hydrogen thereto. Examples of the conjugated diene monomer may include a conjugated diene having at least 4 carbon atoms, for example, 1,3-butadiene, isoprene, 2,3-dimethyl-1,3-butadiene, and 1,3-pentadiene. For example, the conjugated diene may be 1,3-butadiene used alone or as a combination of two or more selected from the aforementioned examples.

The non-fluorine containing binder may be used as a dispersion or an solution, in which the binder is dispersed or dissolved in a dispersion medium (water or an organic solvent) (hereinafter, referred to "a binder dispersion"). Any dispersion medium that may uniformly disperse and dissolve the binder may be used. Water may be used as the dispersion medium due to its environment friendliness and fast drying speed. Also, examples of the organic solvent may include ring-shaped aliphatic hydrocarbons such as cyclopentane and cyclohexane; aromatic hydrocarbons such as toluene, xylene, and ethylbenzene; ketones such as acetone, ethylmethylketone, diisopropylketone, cyclohexanone, methylcyclohexane, and ethylcyclohexane; chlorinated aliphatic hydrocarbons such as methylchloride, chloroform, and carbon tetrachloride; esters such as ethylacetate, butylacetate, γ-butyrolactone, and ε-caprolactone; acetonitriles, such as acetonitrile and propionitrile; ethers such as tetrahydrofuran and ethyleneglycoldi ethylether: alcohols such as methanol, ethanol, isopropanol, ethyleneglycol, and ethyleneglycolmonomethylether; and amides such as N-methylpyrrolidone and N,N-dimethylformimide. The dispersion medium may be used alone or as a combination of at least two selected from the aforementioned examples. For example, water or N-methylpyrrolidone (NMP) may be used in terms of improving smoothness of an electrode by suppressing volatilization of the electrode active material slurry.

When the non-fluorine containing binder is dispersed in a dispersion medium in the state of particles, an average particle diameter (dispersion particle diameter) of the dispersed binder may be in a range of 10 nm to 500 nm, for example, 20 nm to 300 nm or 50 nm to 200 nm. Stiffness and flexibility of an electrode prepared with the dispersed binder having an average particle diameter in this range may be improved.

When the non-fluorine containing binder is dispersed in a dispersion medium in the state of particles, a solid content in the binder dispersion may be in a range of 15 wt % to 70 wt %, for example, 20 wt % to 65 wt % or 30 wt % to 60 wt % based on the total weight of the binder dispersion. Electrode active material slurry may be easily prepared with a solid content in this range.

A glass transition temperature (Tg) of the non-fluorine containing binder may be in a range of −40° C. to 30° C., for example, −40° C. to 25° C., −40° C. to 20° C., −40° C. to 15° C., or −40° C. to 5° C. When the non-fluorine containing binder has a glass transition temperature in the range above, an electrode including the non-fluorine containing binder may have improved stiffness and flexibility. A glass transition temperature of the non-fluorine containing binder may be controlled by combining various monomers. When a glass transition temperature of the non-fluorine containing binder is lower than −40° C., a surface of the electrode plate becomes sticky, and thus manufacture of a battery may be difficult. When a glass transition temperature of the non-fluorine containing binder is higher than 30° C., flexibility of the electrode may be degraded.

In the binder composition for a secondary battery, a content of the non-fluorine containing binder may be in a range of 5 wt % to 40 wt % based on 100 wt % of the total weight of the binder composition. For example, a content of the non-fluorine containing binder may be in a range of 10 wt % to 30 wt % based on the total weight of the binder composition. For example, a content of the second fluorine containing binder may be in a range of 10 wt % to 25 wt % based on the total weight of the binder composition. When a content of the second fluorine containing binder is less than 5 wt %, flexibility of an electrode plate and dispersibility of a conducting agent may degrade, and when a content of the second fluorine containing binder is greater than 40 wt %, stability of slurry may degrade.

According to another embodiment of the present disclosure, a cathode includes a cathode active material, a conducting agent, and the binder composition for a secondary battery described above.

In the cathode, a content of the binder composition may be in a range of 0.5 part to 5 parts by weight based on 100 parts by weight of the cathode active material. For example, a content of the binder composition may be in a range of 0.5 part to 4 parts by weight, 0.5 part to 3 parts by weight, 5 part to 2 parts by weight, or 0.5 part to 1.5 parts by weight based on 100 parts by weight of the cathode active material in the cathode. When a content of the binder composition in the cathode is greater than 5 parts by weight, contents of an electrode active material and a conducting agent reduce, and thus a discharge capacity and energy density may be decreased. When a content of the binder composition is less than 0.5 part by weight, adhesiveness and flexibility of an electrode active material layer may degrade.

A weight of a cathode mixture per unit area in the cathode may be greater than 40 mg/cm$^2$, for example, greater than 45 mg/cm$^2$ or greater than 50 mg/cm$^2$. A cathode having a thick active material layer (i.e., high loading) may be manufactured by having a weight of a cathode mixture per unit area greater than 40 mg/cm$^2$, and thus energy density of the electrode may increase. The cathode mixture refers to a cathode material layer including a cathode active material that is obtained by drying cathode active material slurry, a conducting agent, and a binder.

A cathode mixture density may be 3.5 mg/cc or greater. For example, a cathode mixture density may be 3.7 mg/cc or greater, 3.9 mg/cc or greater, 4.0 mg/cc or greater, 4.1 mg/cc or greater, or 4.2 mg/cc or greater. Energy density of the cathode may increase as the cathode mixture density becomes equal to or greater than 3.5 mg/cc.

The cathode may be, for example, formed of a cathode active material composition including a cathode active material, a conducting agent, and the binder composition for a secondary battery in a predetermined shape or by using a method of coating the cathode active material composition on a current collector, such as copper foil.

In particular, a cathode active material composition, in which a cathode active material, a conducting agent, the binder composition for a secondary battery described above, and a solvent are mixed, is prepared. An anode plate is prepared by directly coating the cathode active material composition on a metal current collector. Alternatively, the cathode active material composition may be casted on a separate support, and then a film detached from the support is laminated on a metal current collector to prepare a cathode plate. The cathode is not limited to the ones described above, but any form of cathode may be used.

The cathode active material may be at least one selected from the group consisting of a lithium cobalt oxide, a lithium nickel cobalt manganese oxide, a lithium nickel cobalt aluminum oxide, a lithium iron phosphate, and a lithium manganese oxide, but is not limited thereto, and any cathode active material available in the art may be used.

For example, the cathode active material may be a compound that is represented by one of formulae $Li_aA_{1-b}B^1_bD^1_2$ (where $0.90 \le a \le 1.8$, and $0 \le b \le 0.5$);
$Li_aE_{1-b}B^1_bO_{2-c}D^1_c$ (where $0.90 \le a \le 1.8$, $0 \le b \le 0.5$, and $0 \le c \le 0.05$);
$LiE_{2-b}B^1_bO_{4-c}D^1_c$ (where $0 \le b \le 0.5$, and $0 \le c \le 0.05$);
$Li_aNi_{1-b-c}Co_bB^1_cD^1_\alpha$ (where $0.90 \le a \le 1.8$, $0 \le b \le 0.5$, $0 \le c \le 0.05$, and $0 \le \alpha \le 2$);
$Li_aNi_{1-b-c}Co_bB^1_cO_{2-\alpha}F^1_\alpha$ (where $0.90 \le a \le 1.8$, $0 \le b \le 0.5$, $0 \le c \le 0.05$, and $0 \le \alpha \le 2$);
$Li_aNi_{1-b-c}Co_bB^1_cO_{2-\alpha}F^1_2$ (where $0.90 \le a \le 1.8$, $0 \le b \le 0.5$, $0 \le c \le 0.05$, and $0 \le \alpha \le 2$);
$Li_aNi_{1-b-c}Mn_bB^1_cD^1_\alpha$ (where $0.90 \le a \le 1.8$, $0 \le b \le 0.5$, $0 \le c \le 0.05$, and $0 \le \alpha \le 2$);
$Li_aNi_{1-b-c}Mn_bB^1_cO_{2-\alpha}F^1_\alpha$ (where $0.90 \le a \le 1.8$, $0 \le b \le 0.5$, $0 \le c \le 0.05$, and $0 \le \alpha \le 2$);
$Li_aNi_{1-b-c}Mn_bB^1_cO_{2-\alpha}F^1_2$ (where $0.90 \le a \le 1.8$, $0 \le b \le 0.5$, $0 \le c \le 0.05$, and $0 \le \alpha \le 2$);
$Li_aNi_bE_cG_dO_2$ (where $0.90 \le a \le 1.8$, $0 \le b \le 0.9$, $0 \le c \le 0.5$, and $0.001 \le d \le 0.1$);
$Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$);
$Li_aNiG_bO_2$ (where $0.90 \le a \le 1.8$, and $0.001 \le b \le 0.1$);
$Li_aCoG_bO_2$ (where $0.90 \le a \le 1.8$, and $0.001 \le b \le 0.1$);
$Li_aMnG_bO_2$ (where $0.90 \le a \le 1.8$, and $0.001 \le b \le 0.1$);
$Li_aMn_2G_bO_4$ (where $0.90 \le a \le 1.8$, and $0.001 \le b \le 0.1$); $LiQS_2$; $V_2O_5$; $LiV_2O_5$; $LiI^1O_2$;
$LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulae above, A may be selected from the group consisting of nickel (Ni), cobalt (Co), manganese (Mn), and combinations thereof; $B^1$ may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ may be selected from the group consisting of oxygen (O), fluorine (F), sulfur (S), phosphorus (P), and combinations thereof; E may be selected from the group consisting of cobalt (Co), manganese (Mn), and combinations thereof; $F^1$ may be selected from the group consisting of fluorine (F), sulfur (S), phosphorus (P), and combinations thereof; G may be selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q may be selected from the group consisting of titanium (Ti), molybdenum (Mo), manganese (Mn), and combinations thereof; $I^1$ may be selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof.

In some embodiments, at least one of the compounds listed above as cathode active materials may have a coating layer on a surface of the compound or may be used as a mixture of a compound without a coating layer and a compound having a coating layer, the compounds being selected from the compounds listed above. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. In certain embodiments, the coating layer may be formed using any method that does not adversely affect the physical properties of the cathode active material when a compound of the coating element is used. In certain embodiments, the coating layer may be formed using a spray coating method, a dipping method, or the like. This will be understood to those of ordinary skill in the art, and thus detailed description thereof is omitted.

For example, the cathode active material may include LiNiO$_2$, LiCoO$_2$, LiMn$_x$O$_{2x}$ (x=1, 2), LiNi$_{1-x}$Mn$_x$O$_2$ (0<x<1), LiNi$_{1-x-y}$Co$_x$Mn$_y$O$_2$ (0≤x≤0.5, 0≤y≤0.5), LiFeO$_2$, V$_2$O$_5$, TiS, and MoS.

Particularly, the cathode active material may be formed of a compound represented by at least one of Formulae 1 to 7:

$$pLi_2MO_3\text{-}(1-p)LiMeO_2 \qquad \text{Formula 1}$$

In Formula 1, 0<p≤0.8, M may be at least one selected from the group consisting of Ru, Rh, Pd, Os, Ir, Pt, Mg, Ca, Sr, Ba, Ti, Zr, Nb, Mo, W, Zn, Al, Si, Ni, Mn, Cr, Fe, Mg, Sr, V, and a rare earth element, and Me may be at least one selected from the group consisting of Ti, V, Cr, Mn, Fe, Co, Ni, Cu, Al, Mg, Zr, and B.

$$Li[Li_xMe_y]O_{2+d} \qquad \text{Formula 2}$$

In Formula 2, x+y=1, 0<x<1, 0≤d≤0.1, and Me may be at least one selected from the group consisting of Mn, V, Cr, Fe, Co, Ni, Zr, Re, Al, B, Ge, Ru, Sn, Ti, Nb, Mo, and Pt.

$$xLi_2MO_3\text{-}yLiMeO_2\text{-}zLi_{1+d}M'_{2-d}O_4 \qquad \text{Formula 3}$$

In Formula 3, x+y+z=1; 0<x<1, 0<y<1, 0<z<1; 0≤d≤0.33, M may be at least one selected from the group consisting of Mg, Ca, Sr, Ba, Ti, Zr, Nb, Mo, W, Zn, Al, Si, Ni, Mn, Cr, Fe, Mg, Sr, V, and a rare earth element, Me may be at least one selected from the group consisting of Ti, V, Cr, Mn, Fe, Co, Ni, Cu, Al, Mg, Zr, and B, and M' may be at least one selected from the group consisting of Ti, V, Cr, Mn, Fe, Co, Ni, Cu, Al, Mg, Zr, and B.

$$Li_xCo_{1-y}M_yO_{2-\alpha}X_\alpha \qquad \text{Formula 4}$$

$$Li_xCo_{1-y-z}Ni_yM_xO_{2-\alpha}X_\alpha \qquad \text{Formula 5}$$

$$Li_xMn_{2-y}M_yO_{4-\alpha}X_\alpha \qquad \text{Formula 6}$$

$$Li_xCo_{2-y}M_yO_{4-\alpha}X_\alpha \qquad \text{Formula 7}$$

$$Li_xMe_yM_zPO_{4-\alpha}X_\alpha \qquad \text{Formula 8}$$

In Formulae 4 to 8, 0.90≤x≤1.1, 0≤y≤0.9, 0≤z≤0.5, 1−y−z>0, 0≤α≤2, Me may be at least one selected from the group consisting of Ti, V, Cr, Mn, Fe, Co, Ni, Cu, Al, Mg, Zr, and B, M may be at least one selected from the group consisting of Mg, Ca, Sr, Ba, Ti, Zr, Nb, Mo, W, Zn, Al, Si, Ni, Mn, Cr, Fe, Mg, Sr, V, and a rare earth element, and X may be at least one selected from the group consisting of O (oxygen), F (fluorine), S (sulfur), and P (phosphorus).

Examples of the conducting agent are acetylene black, ketjen black, natural graphite, artificial graphite, carbon black, carbon fiber, and metal powder and metal fiber of, for example, copper, nickel, aluminum or silver. In some embodiments at least one conducting material such as polyphenylene derivatives may be used in combination. Any conducting agent available in the art may be used.

A common binder may be further used in addition to the binder composition for a secondary battery described above. Examples of the common binder include a vinylidene fluoride/hexafluoropropylene copolymer, polyvinylidenefluoride (PVDF), polyacrylonitrile, polymethylmethacrylate, polytetrafluoroethylene, and a mixture thereof or a styrene butadiene rubber-based polymer, but are not limited thereto, and any material available as a binder in the art may be used.

Examples of the solvent include N-methylpyrrolidone, acetone, and water, but are not limited thereto, and any material available as a solvent in the art may be used.

Amounts of the cathode active material, the conducting agent, the common binder, and the solvent are those levels generally used in lithium batteries. At least one of the conducting agent, the common binder, and the solvent may not be used according to the use and the structure of the lithium battery.

According to another embodiment of the present disclosure, a lithium battery includes the cathode described above. The lithium battery may be manufactured in the following manner.

First, a cathode is prepared according to the method of preparing a cathode.

Next, an anode active material composition including an anode active material, a conducting agent, a binder, and a solvent is prepared. The negative active material composition is directly coated on a metal current collector and dried to prepare an anode plate. Alternatively, the anode active material composition is casted on a separate support, and then a film detached from the support is laminated on the metal current collector to prepare an anode plate.

In some embodiments, the anode active material may be a non-carbon-based material. For example, the anode active material may be at least one selected from the group consisting of a metal being capable of alloying with lithium, an alloy thereof, and an oxide thereof. Alternatively, the anode active material may be a transition metal oxide or a non-transition metal oxide.

For example, examples of the metal being capable of alloying with lithium may include Si, Sn, Al, Ge, Pb, Bi, Sb, a Si—Y alloy (where Y is an alkali metal, an alkali earth metal, an element of Group XIII to Group XIV, a transition metal, a rare earth element, or a combination thereof except for Si), and a Sn—Y alloy (where Y is an alkali metal, an alkali earth metal, an element of Group XIII to Group XIV, a transition metal, a rare earth element, or a combination thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof Examples of the transition metal oxide include a lithium titanium oxide, a vanadium oxide, and a lithium vanadium oxide.

Examples of the non-transition metal oxide include SnO$_2$ and SiO$_x$ (0<x<2).

In particular, the anode active material may be at least one selected from the group consisting of Si, Sn, Pb, Ge, Al, SiO$_x$ (0<x≤2), SnO$_y$ (0<y≤2), Li$_4$Ti$_5$O$_{12}$, TiO$_2$, LiTiO$_3$, and Li$_2$Ti$_3$O$_7$, but is not limited thereto, and any material available as a non-carbon-based anode active material in the art may be used.

Also, a composite of the non-carbon-based anode active material and a carbon-based material may be used or a carbon-based anode active material may be included in addition to the non-carbon-based material.

Examples of the carbon-based material include crystalline carbon, amorphous carbon, or a mixture thereof. The crystalline carbon may be non-shaped, or sheet, flake, spherical, or fiber shaped natural graphite or artificial graphite. The amorphous carbon may be a soft carbon (carbon obtained through sintering at a low temperature), a hard carbon (carbon obtained through sintering at a high temperature), mesophase pitch carbide, fired coke, and so on.

In some embodiments, the conducting agent, the binder, and the solvent in the anode active material composition may be the same with those used in the cathode active material composition. The anode active material composition may contain only the conventional binder. Also, a plasticizer may be further added into the cathode active material composition and/or the anode active material composition to form pores in the electrode plates.

The amounts of the anode electrode active material, the conducting agent, the binder, and the solvent are those levels that are generally used to manufacture a lithium battery. At least one of the conducting agent, the common binder, and the solvent may not be used according to the use and the structure of the lithium battery.

Next, a separator to be disposed between the cathode and the anode is prepared. Any separator that is commonly used for lithium batteries may be used. In particular, a separator having low resistance to migration of ions in an electrolyte and an excellent electrolyte-retaining ability may be used. Examples of the separator include glass fiber, polyester, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

In some embodiments, the polymer resin used to manufacture the separator may be any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate and a mixture thereof.

Next, an electrolyte is prepared.

For example, the electrolyte may be an organic electrolyte solution. Alternately, the electrolyte may be in a solid phase. Examples of the electrolyte may include a boron oxide and a lithium oxynitride, but are not limited thereto, and any material available as a solid electrolyte in the art may be used. The solid electrolyte may be formed on the anode by sputtering.

In some embodiments, an organic electrolyte solution may be prepared. The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number of 1 to 20, respectively), LiCl, LiI and a mixture thereof.

As shown in FIG. 1, a lithium battery 1 includes a cathode 3, an anode 2, and a separator 4. In some embodiments, the cathode 3, the anode 2 and the separator 4 are wound or folded, and then sealed in a battery case 5. Then, the battery case 5 is filled with an organic electrolyte solution and sealed with a cap assembly 6, thereby completing the manufacture of the lithium battery 1. In some embodiments, the battery case 5 may be a cylindrical type, a rectangular type, or a thin-film type. For example, the lithium battery 1 may be a thin-film type battery. In some embodiments, the lithium battery 1 may be a lithium ion battery. In some embodiments, the lithium battery 1 may be a lithium polymer battery.

In some embodiments, the separator may be interposed between the cathode and the anode to form a battery assembly. In some embodiments, the battery assembly may be stacked or rolled in a bi-cell structure and impregnated with the electrolyte solution. The resultant is put into a pouch and hermetically sealed, thereby completing the manufacture of a lithium ion polymer battery.

In some embodiments, a plurality of battery assemblies may be stacked to form a battery pack, which may be used in any device that operates at high temperatures and requires high output, for example, in a laptop computer, a smart phone, electric vehicle, and the like.

The lithium battery may have improved high rate characteristics and lifetime characteristics, and thus may be applicable in an electric vehicle (EV), for example, in a hybrid vehicle such as plug-in hybrid electric vehicle (PHEV).

One or more embodiments will now be described in more detail with reference to the following examples. However, these examples are for illustrative purposes only and are not intended to limit the scope of the one or more embodiments.

Preparation of a Binder

Preparation of a Cathode and a Lithium Battery

Example 1

Cathode active material slurry was prepared with a mixture of $LiCoO_2$ (LCO) and $LiNi_{0.3}Co_{0.5}Mn_{0.2}O_2$ (NCM) (Umicore, Brussels, Belgium) at a weight ratio of 8:2, carbon black (Ketjen black, ECP, SP5090, Lion Corp., Tokyo, Japan), and a binder to have a weight ratio of 97.8:1.2:1.

A binder composition was prepared as to have a first fluorine containing binder, a second fluorine containing binder, and a non-fluorine containing binder at a weight ratio of 10:80:10 in the cathode active material slurry.

Particularly, the carbon black was added to a non-fluorine containing binder solution (i.e., a binder solution including a hydrogenated acrylonitrile-butadiene binder dispersed in NMP, BM-720H, 300,000 g/mol of a weight average molecular weight, −30° C. of Tg, Nippon Zeon Co. Ltd., Tokyo, Japan) and stirred in a planetary centrifugal mixer (hereinafter, referred to as "Thinky mixer", Thinky Corporation, Laguna Hills, Calif.—USA) at a rate of 2000 rpm for 5 minutes to prepare conducting agent slurry.

Subsequently, a second fluorine containing binder solution (SOLEF 6020, PVDF, 700,000 g/mol of a weight average molecular weight, Solvay, Brussels, Belgium) and the cathode active material were added to the conducting agent slurry, stirred in the Thinky mixer at a rate of 2000 rpm for 5 minutes to prepare first active material slurry.

Then, a first fluorine containing binder solution (SOLEF 5130, modified PVDF containing a carboxylic group, 1,000,000 g/mol of a weight average molecular weight, Solvay, Belgium) was added to the first active material slurry, stirred in the Thinky mixer at a rate of 500 rpm for 5 minutes to prepare second active material slurry.

The second active material slurry was coated on a 12 μm-thick aluminum foil at a thickness of 102 μm, dried at a temperature of 110° C. for 2 hours, and then rolled-pressed at a thickness of 71 μm to prepare a cathode plate. A coin cell (CR2016 type) at a diameter of 32 mm was prepared by using the cathode plate.

In the preparation of the cell, lithium was used as a counter electrode, and a polyethylene separator (separator, Star® 20, Asahi Kasei, Tokyo Japan) at a thickness of 20 μm was used as a separator, and 1.15 M LiPF6 dissolved in a mixed solution of ethylenecarbonate (EC):ethylmethylcarbonate (EMC):diethylcarbonate (DEC) at a volume ratio of 3:3:4 was used as an electrolyte.

Example 2

Cathode active material slurry, a cathode, and a lithium battery were prepared in the same manner as in Example 1, except that a weight ratio of the first fluorine containing binder, the second fluorine containing binder, and the non-fluorine containing binder was changed to 5:80:15 in the binder composition.

Example 3

Cathode active material slurry, a cathode, and a lithium battery were prepared in the same manner as in Example 1, except that a weight ratio of the first fluorine containing binder, the second fluorine containing binder, and the non-fluorine containing binder was changed to 15:70:15 in the binder composition.

Example 4

Cathode active material slurry, a cathode, and a lithium battery were prepared in the same manner as in Example 1, except that a weight ratio of the first fluorine containing binder, the second fluorine containing binder, and the non-fluorine containing binder was changed to 25:60:15 in the binder composition.

Example 5

Cathode active material slurry, a cathode, and a lithium battery were prepared in the same manner as in Example 1, except that a weight ratio of the first fluorine containing binder, the second fluorine containing binder, and the non-fluorine containing binder was changed to 15:60:25 in the binder composition.

Example 6

Cathode active material slurry, a cathode, and a lithium battery were prepared in the same manner as in Example 5, except that the non-fluorine containing binder was changed from BM-720H to Therban 4307 (Mooney viscosity=63, Lanxess AG, Cologne, Germany).

Example 7

Cathode active material slurry, a cathode, and a lithium battery were prepared in the same manner as in Example 1, except that a weight ratio of the first fluorine containing binder, the second fluorine containing binder, and the non-fluorine containing binder was changed to 25:50:25 in the binder composition.

Comparative Example 1

Cathode active material slurry, a cathode, and a lithium battery were prepared in the same manner as in Example 1, except that a weight ratio of the first fluorine containing binder, the second fluorine containing binder, and the non-fluorine containing binder was changed to 30:40:30 in the binder composition.

Comparative Example 2

Cathode active material slurry, a cathode, and a lithium battery were prepared in the same manner as in Example 1, except that a weight ratio of the first fluorine containing binder, the second fluorine containing binder, and the non-fluorine containing binder was changed to 15:85:0 in the binder composition.

Comparative Example 3

Cathode active material slurry, a cathode, and a lithium battery were prepared in the same manner as in Example 1, except that a weight ratio of the first fluorine containing binder, the second fluorine containing binder, and the non-fluorine containing binder was changed to 0:85:15 in the binder composition.

Evaluation Example 1: Adhesiveness Measurement (Peel Off Test)

The cathode plates prepared in Examples 1 to 7 and Comparative Examples 1 to 3 were cut into a size of 2.5 cm×10 cm, and each of the cathode plates was put on a slide glass such that an active material layer of the cathode plate faces the slide glass. Then, the cathode plate was attached on the slide glass by using a roller. A part of the current collector was detached therefrom and then folded in the opposite direction.

The slide glass and the folded current collector of the cathode plate were each fixed by using a UTM (QC-513A2, available from Cometech, Fengyuan District, Taiwan), and the slide glass and the folded current collector of the cathode plate were pulled at a rate of 100 mm/sec and an angle of 180 degrees to measure the adhesiveness.

An average value of a region where the pulling force maintained constant was read as the adhesiveness value.

The results are shown in Table 1.

Evaluation Example 2: Resistance Measurement of Electrode Plate

The cathode plates prepared in Examples 1 to 7 and Comparative Examples 1 to 3 were cut into a size of 36π. RS1300N (Napson Corporation, Tokyo, Japan) was used to measure a contact surface resistance of each of the cathode plates. After 10 seconds of contact, the resistance value was read. A specific resistance was calculated by reflecting a weight and a mixture density of a cathode mixture per unit area of the cathode plate (that is, the specific resistance was expressed by reflecting a thickness factor to the electrode plate resistance). The results are shown in Table 1.

Evaluation Example 3: Electrode Plate Stiffness Measurement (Bending Stress Test)

The cathode plates prepared in Examples 1 to 7 and Comparative Examples 1 to 3 were cut into a size of 10 mm×20 mm. Then, each of the cathode plates was placed on a spot between two points having a 10 mm-interval by using a three point bending tester (manufactured in-house), and a bending test was performed by pressing a center of the cathode plate using the remaining point to bend the cathode plate. The maximum value of the measurement was read as the stiffness value under a measuring speed of 100 mm/min. The results are shown in Table 1.

Evaluation Example 4: Slurry Stability Measurement

Stability of the cathode active material slurry prepared in Examples 1 to 7 and Comparative Examples 1 to 3 was measured in the following manner.
A viscosity of slurry was measured for 3 days, and the slurry having 20% or more change in the viscosity within the 3 days was determined as it lacks stability.
The results are shown in Table 1.

Evaluation Example 5: Loading Amount (L/L(Mg/Cm$^2$)) Measurement

A weight of a cathode mixture per unit area of the cathode plates prepared in Examples 1 to 7 and Comparative Examples 1 to 3 was measured in the following manner. A loading amount is a weight of a cathode mixture per unit area.
A circular electrode plate of 14π was cut from the cathode plate, and a weight of the cathode mixture (the total weight of the cathode plate−a weight of a current collector) was divided by the electrode plate area of 14π to calculate the loading amount.
The results are shown in Table 1.

Evaluation Example 6: Mixture Density Measurement

A mixture density of the cathode plates prepared in Examples 1 to 7 and Comparative Examples 1 to 3 was measured in the following manner.

The loading amount (L/L) measured in Evaluation Example 5 was divided by a thickness of the cathode mixture (a thickness of the cathode plate−a thickness of a current collector).
The results are shown in Table 1.

Evaluation Example 7: Evaluation of 4.3 V Cut-Off Charge-Discharge Characteristics The coin cells prepared in Examples 1 to 7 and Comparative Examples 1 to 3 was charged with a constant current of 0.05 C rate until a cell voltage reached 4.3 V (with respect to Li) at a temperature of 25° C. and charged with a constant voltage while maintaining the voltage at 4.3 V until a cell current reached 0.02 C. Then, the cell was discharged until a cell voltage reached 3.0 V (with respect to Li) with a constant current of 0.05 C (formation process).
Subsequently, each of the lithium batteries after the formation process was charged with a constant current of 0.1 C rate at about 25° C. until the voltage of the cell reached about 4.3 V (with respect to Li) and charged with a constant voltage while maintaining the voltage at 4.3 V until a cell current reached 0.02 C. Then, a discharging cycle with a constant current of about 0.1 C until the voltage reached 3.0 V (with respect to Li). This charge/discharge cycle was repeated 100 times. A capacity retention rate is defined by Equation 1. The charging and discharging results are shown in Table 1.

$$\text{Capacity retention (\%)}=[100^{th} \text{ cycle discharge capacity}/1^{st} \text{ cycle discharge capacity}]\times 100 \qquad \text{Equation 1}$$

Evaluation Example 8: Evaluation of 4.4 V Cut-Off Charge-Discharge Characteristics The coin cells prepared in Examples 1 to 7 and Comparative Examples 1 to 3 was charged with a constant current of 0.05 C rate until a cell voltage reached 4.4 V (with respect to Li) at a temperature of 25° C. and charged with a constant voltage while maintaining the voltage at 4.4 V until a cell current reached 0.02 C. Then, the cell was discharged until a cell voltage reached 3.0 V (with respect to Li) with a constant current of 0.05 C (formation process).
Subsequently, each of the lithium batteries after the formation process was charged with a constant current of 0.7 C rate at about 25° C. until the voltage of the cell reached about 4.4 V (with respect to Li) and charged with a constant voltage while maintaining the voltage at 4.4 V until a cell current reached 0.02 C. Then, a discharging cycle with a constant current of about 0.5 rate C until the voltage reached 3.0 V (with respect to Li). This charge/discharge cycle was repeated 100 times. A capacity retention is defined by Equation 1. The charging and discharging results are shown in Table 1.

TABLE 1

| | Adhesiveness [gf/mm] | Bending stress [mN] | Electrode plate resistance [Ω] | Slurry stability | L/L [mg/cm$^2$] | Mixture density [mg/cm$^3$] | Capacity retention rate [4.3 V cut-off, at 100 cycles] | Capacity retention rate [4.4 V cut-off, at 100 cycles] |
|---|---|---|---|---|---|---|---|---|
| Ex. 1 | 1.34 | 3.24 | 11.48 | stable | 55.2 | 3.95 | 92.2 | 84.6 |
| Ex. 2 | 1.26 | 2.97 | 11.15 | stable | 55.1 | 3.96 | 92.4 | 84.5 |
| Ex. 3 | 1.50 | 3.30 | 11.72 | stable | 55.2 | 3.94 | 92.8 | 84.0 |
| Ex. 4 | 1.75 | 4.47 | 12.10 | stable | 55.1 | 3.93 | 90.7 | 83.2 |
| Ex. 5 | 1.53 | 2.17 | 11.28 | stable | 55.2 | 3.95 | 90.3 | 83 |
| Ex. 6 | 1.61 | 2.34 | 11.28 | stable | 55.1 | 3.94 | 91.0 | 83.1 |

TABLE 1-continued

|  | Adhesive-ness [gf/mm] | Bending stress [mN] | Electrode plate resistance [Ω] | Slurry stability | L/L [mg/cm²] | Mixture density [mg/cm³] | Capacity retention rate [4.3 V cut-off, at 100 cycles] | Capacity retention rate [4.4 V cut-off, at 100 cycles] |
|---|---|---|---|---|---|---|---|---|
| Ex. 7 | 1.79 | 3.07 | 12.21 | unstable | 54.2 | 3.92 | 88.2 | 80.0 |
| Comp. Ex. 1 | 1.83 | 3.51 | 12.13 | unstable | 54.0 | 3.93 | 82.4 | 72.2 |
| Comp. Ex. 2 | 1.51 | 4.72 | 16.42 | stable | 49.1 | 3.94 | 81.9 | 70.4 |
| Comp. Ex. 3 | 0.94 | 1.97 | 11.98 | stable | 55.1 | 3.95 | 81.7 | 71.8 |

As shown in Table 1, the lithium batteries prepared in Examples 1 to 7 had improved energy density and cycle life characteristics by including the cathodes having adhesiveness and flexibility at the same time by using the novel binder composition compared to the lithium batteries prepared in Comparative Examples 1 to 3.

Also, the lithium battery prepared in Comparative Example 1 had a low slurry stability due to a low content of the second fluorine containing binder. The lithium battery prepared in Comparative Example 2 did not include the non-fluorine containing binder, and thus the electrode plate was broken due to lack of electrode plate flexibility. The lithium battery prepared in Comparative Example 3 did not include the first fluorine containing binder, and thus electrode plate was detached due to lack of electrode plate adhesiveness.

As described above, according to the one or more of the above embodiments of the present disclosure, energy density and cycle life characteristics of a lithium battery may be improved by including a binder composition for a secondary battery, wherein the binder composition includes a first fluorine containing binder containing a polar functional group; a second fluorine containing binder not containing a polar functional group; and a non-fluorine containing binder including a repeating unit resulting from polymerization of an acryl monomer and a repeating unit resulting from polymerization of an olefin monomer, wherein the first fluorine containing binder is a vinylidene fluoride containing binder.

It should be understood that the exemplary embodiments described therein should be considered in a descriptive sense only and not for purposes of limitation. Descriptions of features or aspects within each embodiment should typically be considered as available for other similar features or aspects in other embodiments.

In the present disclosure, the terms "Example," "Comparative Example" and "Evaluation Example" are used arbitrarily to simply identify a particular example or experimentation and should not be interpreted as admission of prior art. While one or more embodiments of the present disclosure have been described with reference to the FIGURES, it will be understood by those of ordinary skill in the art that various changes in form and details may be made therein without departing from the spirit and scope of the present embodiments as defined by the following claims.

What is claimed is:

1. A binder composition for a secondary battery, the binder composition comprises:
a first fluorine containing binder including a repeating unit comprising a polar functional group, wherein a weight average molecular weight of the first fluorine containing binder is in a range of 300,000 g/mol to 1,500,000 g/mol;
a second fluorine containing binder not including a polar functional group, wherein a weight average molecular weight of the second fluorine containing binder is in a range of 200,000 g/mol to 1,200,000 g/mol; and
a non-fluorine containing binder comprising a repeating unit resulting from polymerization of an acryl monomer and a repeating unit resulting from polymerization of an olefin monomer, wherein a weight average molecular weight of the non-fluorine containing binder is in a range of 100,000 g/mol to 500,000 g/mol,
wherein the first fluorine containing binder is a vinylidene fluoride containing binder,
wherein a content of the first fluorine containing binder including a repeating unit comprising a polar functional group is in a range of 5 wt % to 25 wt % based on the total weight of the binder composition,
wherein a content of the a second fluorine containing binder is in a range of 60 wt % to 80 wt % based on the total weight of the binder composition, and
wherein a content of the non-fluorine containing binder is in a range of 10 wt % to less than 25 wt % based on the total weight of the binder composition,
wherein the first fluorine containing binder is modified poly(vinylidene fluoride) (PVDF) containing a carboxylic group,
wherein the second fluorine containing binder is PVDF, and
wherein the non-fluorine containing binder is a hydrogenated acrylonitrile-butadiene binder.

2. The binder composition of claim 1, wherein a content of the repeating unit comprising the polar functional group of the first fluorine containing binder is greater than 0 to 10 mol % or less.

3. The binder composition of claim 1, wherein a weight average molecular weight of the first fluorine containing binder is in a range of 500,000 g/mol to 1,500,000 g/mol.

4. The binder composition of claim 1, wherein a weight average molecular weight of the second fluorine containing binder is in a range of 300,000 g/mol to 1,000,000 g/mol.

5. The binder composition of claim 1, wherein a content of the repeating unit resulting from polymerization of an acryl monomer is in a range of 1 wt % to 70 wt % in the non-fluorine containing binder.

6. The binder composition of claim 1, wherein an iodine value of the non-fluorine containing binder is 100 or less.

7. The binder composition of claim 1, wherein a glass transition temperature of the non-fluorine containing binder is in a range of −40° C. to 30° C.

8. A cathode comprising:
a cathode active material;
a conducting agent; and
the binder composition of claim 1.

9. The cathode of claim 8, wherein a content of the binder composition is in a range of 0.5 part to 5 parts by weight based on 100 parts by weight of the cathode active material.

10. A lithium battery comprising the cathode of claim 8.

11. The lithium battery of claim 10, wherein a voltage of the lithium battery is 4.0 V or greater.

* * * * *